Patented Apr. 26, 1932

1,855,367

UNITED STATES PATENT OFFICE

FREDERICK W. SKIRROW AND GEORGE O. MORRISON, OF SHAWINIGAN FALLS, QUEBEC, CANADA, ASSIGNORS TO CANADIAN ELECTRO PRODUCTS COMPANY, LIMITED, OF MONTREAL, QUEBEC, CANADA

PROCESS OF MAKING DIESTERS OF CARBOXYLIC ACIDS

No Drawing. Application filed March 25, 1929, Serial No. 349,892, and in Canada March 17, 1928.

This invention relates to improvements in the manufacture of diesters by reaction of acetylene and carboxylic acids, and relates more particularly to the manufacture of ethylidene diacetate, and the object of the invention is to enable high yields of diesters to be obtained.

This application is a continuation in part of our former application, Ser. No. 262,602, filed the 17th March 1928.

It is known, for example, from U. S. Patent No. 1,638,713, granted the 9th August 1927, that when acetylene gas is passed into a carboxylic acid in presence of a catalyst prepared in the acid by precipitation of a salt of mercury with sulphuric acid, a vinyl ester and a diester are produced.

It has now been discovered that the reaction between acetylene and carboxylic acids, especially acetic acid, is extremely sensitive to temperature and other conditions, such as the state or nature of the catalyst.

In the application aforesaid these conditions were disclosed in relation to the manufacture of both vinyl esters and diesters but in the example the proportions given and the manner of treatment were those most favorable to high yields of vinyl esters.

The present invention, therefore, relates particularly to those conditions of temperature, apparatus, catalyst and the like which enable high and commercially economical yields of diesters to be obtained.

According to the present invention, as practised for the production of ethylidene diacetate, formation of the catalyst is initiated by precipitating an acetic acid salt of mercury in solution in acetic acid, by addition as hereinafter described of a body containing free sulphur trioxide, examples of such bodies being gaseous sulphur trioxide, sulphuric anhydride and fuming sulphuric acid, or oleum. The term "sulphur trioxide" as hereinafter used will be understood to be without limitation as to the manner of introduction, i. e., whether gaseous, liquid, solid, or in solution, in sulphuric acid. The mercury salt used may be externally prepared or prepared in the acetic acid by introducing an oxide of mercury, which reacts with the acid to produce an acetate. The acetate is then precipitated by addition of sulphur trioxide, the latter having been previously treated with acetic anhydride under suitable conditions to give acetyl sulphuric acid. From observation of the results obtained, the mechanism of the reaction may be somewhat as follows:—Sulphur trioxide combines with acetic acid to produce acetyl sulphuric acid, although depending on the conditions of temperature some sulphacetic acid may also be produced. It is known from the work of van Peski (Rec. Trav. Chim. 1921, 40, pages 103–118 and Chem. Zentralblatt 1921, 111, page 609) that at low temperatures sulphur trioxide and acetic acid combine to form acetyl sulphuric acid, $CH_3.CO.O.SO_3H$, while at high temperatures sulphacetic acid,

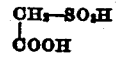

is predominantly formed. Van Peski also shows the transition of acetyl sulphuric acid into sulphacetic acid. In one hour at 70° C. the transition is 72.5% and in three hours, 88.3%. It is well known that the velocity of such reactions is materially reduced by lowering the temperature. At 20° C. acetyl sulphuric acid is substantially stable. On the addition of the sulphur trioxide-acetic acid reaction product to the mercuric salt dissolved in acetic acid a precipitate is produced, which body is catalytic or becomes so on the passage of acetylene. In general, the lower the temperature at which the sulphur trioxide and acetic acid are reacted, the more active is the catalyst.

At temperatures beeween 60° or slightly lower and 100° C. or slightly higher, the acetylene absorption reaction proceeds smoothly with a satisfactory yield of ethylidene diacetate, but lower temperatures may be used. A very large amount of the ester per pound of catalyst is produced as compared to results previously obtained, this amounting to as much as 150 pounds per pound of the mercury oxide used. Such results are obtained primarily with the use of sulphuric anhydride and fuming sulphuric acid containing a large excess of free sulphur trioxide, and lesser yields per pound of mercury are obtained by the use of sulphuric acid alone. Temperatures between 60° and 20° C. or as much lower as enable the reaction to proceed are more favorable to production of vinyl acetate but, if the vinyl ester is left in contact with the acetic acid and catalyst, it converts to the diester. Thus, working at a temperature between the optimum temperature for initial diacetate production and the optimum temperature for vinyl acetate production, as much as 250 pounds of diester may be produced per pound of mercuric oxide reduced after conversion of the vinyl ester to diester. This high yield per pound of mercury oxide as compared with the prior art, which discloses less than 30 parts of ester per part of mercury oxide, is attributed to use of acetyl sulphuric acid as the precipitant.

In the formation of the catalyst, sulphur trioxide may be added directly to a mixture of acetic acid and dissolved mercury acetate, or may be first of all reacted in a suitable manner with the acetic acid, which is then added to a solution of the mercury salt in acetic acid. The precipitant is preferably used in excess of the amount required for actual precipitation of the mercury salt. In the formation of the precipitant using gaseous sulphur trioxide or fuming sulphuric acid, excesses of 1% and 1½% respectively based on the amount of acetic acid have been found satisfactory, but there may be variation both above and below these percentages from practically no excess up to an amount considerably above 1% or 1½%—say to 5%.

The temperatures prevailing during preparation of the precipitant and also during the precipitation of the catalyst may be varied in each case through a very wide range.

The precipitated material thus formed is found to be in very finely divided and reactive form and, upon passage of acetylene gas into the reaction mixture under proper conditions, very good yields of diester are obtained.

In order to obtain the best results, the rate of acetylene supply should be in excess of the rate of fixation and any vinyl ester, diester and acid carried out of the reaction vessel by the escaping excess acetylene may be condensed and refluxed to the reaction, where the vinyl ester reacts with the acid and is converted to diester. The temperature of the reaction has an important bearing on the yield, for example, the best temperature for initial production of ethylidene diacetate with a catalyst precipitated by addition of gaseous sulphur trioxide or fuming sulphuric acid is between 60° and 100° C., preferably around 80° C. At lower temperatures, larger amounts of vinyl ester are produced. The desired reaction temperature is maintained, once the reaction has started, by cooling as necessary (the necessity depending upon the chosen temperature and the heat lost by radiation, etc.) until near the end when heating may be necessary.

The material used in construction of the apparatus is of importance since certain products which may be formed and accumulated in the reaction vessel may inhibit the reaction. Excess of iron or copper is detrimental. These conditions indicate the use of special iron alloys of high silicon content, in order to reduce or prevent formation of undesirable impurities. If apparatus of enamelware, earthenware or glass is used, contamination with formed impurities as above indicated is, of course, avoided.

The amount of catalyst present at the outset of the reaction is found to be of relatively small importance. An amount as low as 1% based on the acetic acid has been found economical and satisfactory for vinyl acetate production but, for diester production, the best practice indicates about ½%.

The following examples serve to illustrate methods of practising the invention, but it will be understood that the invention is not limited to the materials, proportions, conditions or apparatus disclosed. Throughout the examples, the parts given are by weight and the reactions are conducted in closed kettles of high silicon iron, known in the trade as "Durion".

*Example I*

10 parts of mercuric oxide is dissolved in 2000 parts of glacial acetic acid and to this is added at 85° C. 276 parts of precipitant formed by reacting 30 parts of sulphur trioxide with 246 parts of glacial acetic acid at a temperature of approximately 20° C. After precipitation of the catalyst, the mixture is brought to a temperature of 60° to 70° C. and an excess of acetylene gas is passed through, the temperature being allowed to rise to approximately 80° C. Reaction takes place with production mainly of ethylidene diacetate, some of which with some of the acid and a small amount of simultaneously produced vinyl acetate distils off or is carried out with the escaping excess of acetylene. The gas and entrained vapours are passed through a reflux condenser connected to the reaction vessel for return of the condensate, the vinyl acetate portion of which converts to diacetate in presence of the acetic acid and catalyst and at the temperature of the reaction. At the end of 1 to 3 hours, depending on the scale of operations and the cooling capacity, the rate of acetylene absorption will commence to diminish, owing to the large percentage conversion of the acid and to the reduction of catalyst.

Example II

The same conditions, methods and proportions as in Example I are used, except that the sulphur trioxide is passed into the acid at temperatures of approximately 45° C.

Example III 10 parts of mercuric oxide is dissolved in 1800 parts of glacial acetic acid and cooled to 20° C. 105 parts of glacial acetic acid is cooled to 17° C. and 75 parts of sulphur trioxide is passed in very slowly with stirring and cooling to bring the temperature below 0° C. The bulk of the trioxide is added at temperatures between 0° C. and 5° C. 85 parts of this acid is diluted with 200 parts of glacial acetic acid at 17° C. and is added to the mercuric acetate solution. The temperatures during the acetylene introduction range between 60° and 100° C.

The process may be made continuous by withdrawing a portion of the reaction liquor from time to time or continuously and replacing it with fresh acid and catalyst in proper proportions to approximately maintain the original ratio of acid to catalyst. If it is desired to recover vinyl acetate from the reaction, the material carried over by the escaping excess acetylene may be continuously distilled and separated from the acetic acid and any diester and the diester and acid returned into the reaction.

By operating at various temperatures between those which give the maximum initial productions of vinyl ester and diester respectively, both esters may be made in various proportions and the vinyl ester either continuously separated or returned into the reaction to realize a very high yield of diester per pound of catalyst reduced.

From the foregoing examples, it will be observed that acetyl sulphuric acid is desirable as the precipitant in order that high yields of the diester be produced and that a large amount of ester be produced per pound of mercury oxide used. Although acetyl sulphuric acid seems to be the desirable material, some particular virtue resides in the method of its formation, inasmuch as if acetyl sulphuric acid is made by treating acetic anhydride with sulphuric acid much poorer results are obtained than those outlined above. This may be in part due to the incomplete reaction of the acetic anhydride on the sulphuric acid under the conditions used.

In utilizing fuming sulphuric acid, it may be pointed out further that better results are obtained the higher the concentration of $SO_3$ present, and this should be preferably 65% to 70%, or over.

Various modifications may be introduced in the method of formation of the catalyst, and the precipitation of the same, and it is understood that the invention is not limited or circumscribed by the methods disclosed, or furthermore, by any theories advanced as to the mechanism of the reaction.

The process may be employed equally well for the manufacture of diesters from other carboxylic acids and may be readily understood from the foregoing description by substituting the names of other acids, such as formic, butyric, propionic, etc. and their derivatives for "acetic", "acetate" etc. in the description. The reaction temperatures will in general be higher than given for acetic acid when dealing with acids of higher molecular weight.

In original application Serial No. 262,602, the necessity of removing the vinyl acetate from contact with the acid is stressed, the reason being that the vinyl acetate readily converts to ethylidene diacetate in contact with the acid and catalyst, even at the low temperatures specified for vinyl acetate manufacture. It is therefore obvious that by omitting to remove vinyl acetate from contact with the acid, ethylidene diacetate may be obtained at the temperatures disclosed for vinyl acetate manufacture. Wherefore, it will be understood that the present application is not confined to operating temperatures between 60° and 100° C. but by use of the improved catalyst extends to those lower temperatures at which a relatively large proportion of vinyl acetate is initially produced, i. e., between 20° C. or somewhat below and 60° C.

Having thus described our invention, what we claim is:—

1. A process of making diesters, which comprises passing acetylene into an aliphatic mono-carboxylic acid in presence of a catalyst, being the result of reacting together a mercury salt of the carboxylic acid and the reaction product of free sulphur trioxide and the carboxylic acid used.

2. A process of making diesters, which comprises passing acetylene into an aliphatic mono-carboxylic acid in presence of a catalyst, being the result of reacting together a mercury salt of the carboxylic acid in solution in the acid and the reaction product of the acid and free sulphur trioxide.

3. A process of making diesters, which comprises passing acetylene into an aliphatic mono-carboxylic acid in presence of a catalyst, being the result of reacting together a mercury salt of the carboxylic acid and the reaction product of the acid and free sulphur trioxide.

4. A process of making ethylidene diacetate, which comprises passing acetylene gas into acetic acid in presence of a catalyst, being the result of reacting together mercuric acetate and the reaction product of sulphur trioxide and acetic acid formed at temperatures such that acetyl sulphuric acid is the major constitutent.

5. A process according to claim 4, in which the acetate is in solution in acetic acid.

6. A process according to claim 4, in which the acetylene-acetic acid reaction is conducted at a temperature between approximately 60° and approximately 100° C.

7. A process according to claim 4, in which the reaction of sulphur trioxide and acetic acid is conducted at a temperature between slightly below 0° C. and 45° C.

8. A process according to claim 4, in which the sulphur trioxide-acetic acid reaction product is reacted with the mercuric acetate solution at a temperature of approximately 85° C.

9. A process according to claim 4, in which the mercuric acetate solution is obtained by reacting together acetic acid and mercuric oxide at a temperature between room temperature and approximately 45° C.

10. A process according to claim 4, in which the sulphur trioxide is present in excess of that required to cause precipitation of the mercuric acetate.

11. A process according to claim 4, in which the mercury catalyst is initially present in amount equivalent to approximately ½% of mercuric oxide based on the amount of acetic acid.

12. A process according to claim 4, in which the acetylene-acetic acid reaction is conducted at a temperature between about 100° C. and about 20° C. while subjecting any vinyl acetate formed to contact with the acetic acid and catalyst.

13. A process of making ethylidene diacetate, which comprises passing acetylene gas into acetic acid in presence of a catalyst formed by reacting together mercuric acetate and acetyl sulphuric acid.

14. A process of making ethylidene diacetate, which comprises passing acetylene gas into acetic acid in presence of a catalyst, composed of acetyl sulphuric acid and the reaction product of acetyl sulphuric acid and mercuric oxide.

15. A process of making ethylidene diacetate, which comprises passing acetylene gas into acetic acid in presence of a catalyst formed by reacting together mercuric acetate and an excess of the reaction product of sulphur trioxide and acetic acid formed at temperatures such that acetyl sulphuric acid is the major constituent.

16. A process of making diesters, which comprises passing acetylene into an aliphatic mono-carboxylic acid in presence of a catalyst formed by reacting together a mercury salt of the carboxylic acid and an excess of the reaction product of free sulphur trioxide and the carboxylic acid used.

17. A process of making diesters, which comprises passing acetylene into an aliphatic mono-carboxylic acid in presence of a catalyst formed by reacting together a mercury salt of the carboxylic acid in solution in the acid and an excess of the reaction product of the acid and free sulphur trioxide.

In witness whereof, we have hereunto set our hands.

FREDERICK W. SKIRROW.
GEORGE O. MORRISON.